United States Patent
Newman et al.

(10) Patent No.: US 9,432,251 B2
(45) Date of Patent: Aug. 30, 2016

(54) ENHANCED ACKNOWLEDGEMENT AND RETRANSMISSION MECHANISM

(71) Applicant: QUALCOMM Incorporated, San Diego, CA (US)

(72) Inventors: Richard Newman, Gainsville, FL (US); Purva R. Rajkotia, Orlando, FL (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 13/790,631

(22) Filed: Mar. 8, 2013

(65) Prior Publication Data
US 2014/0254351 A1 Sep. 11, 2014

(51) Int. Cl.
| H04L 12/26 | (2006.01) |
| H04L 12/24 | (2006.01) |
| H04L 1/18 | (2006.01) |
| H04L 1/22 | (2006.01) |
| H04L 1/00 | (2006.01) |

(52) U.S. Cl.
CPC .......... *H04L 41/0659* (2013.01); *H04L 1/1809* (2013.01); *H04L 1/1864* (2013.01); *H04L 1/1877* (2013.01); *H04L 1/22* (2013.01); *H04L 2001/0096* (2013.01)

(58) Field of Classification Search
CPC ....... H04L 47/12; H04L 47/10; H04L 47/125; H04L 47/32; H04L 47/24; H04L 47/56; H04L 47/34; H04L 69/22; H04L 1/1809
USPC .................. 370/228, 229, 235, 242, 469–473
See application file for complete search history.

(56) References Cited

U.S. PATENT DOCUMENTS

| 4,412,285 A | 10/1983 | Neches et al. |
| 5,594,490 A | 1/1997 | Dawson et al. |
| 6,049,902 A | 4/2000 | Davis et al. |

(Continued)

FOREIGN PATENT DOCUMENTS

| EP | 2061211 | 5/2009 |
| WO | 2014138536 | 9/2014 |

OTHER PUBLICATIONS

Dimic G., et al., "Wireless Networks With Retransmission Diversity Access Mechanisms: Stable Throughput and Delay Properties," IEEE Transactions on Signal Processing, Aug. 2003, vol. 15 (8), pp. 2019-2030.

(Continued)

*Primary Examiner* — Dang Ton
*Assistant Examiner* — Abdeltif Ajid
(74) *Attorney, Agent, or Firm* — DeLizio Law, PLLC

(57) ABSTRACT

Protocol data units (PDUs) associated with a packet stream are transmitted with sequence numbers to support reordering and selective acknowledgement. A selective acknowledgement (SACK) message may be used to indicate at least one sequence number of a lost or corrupted PDU which was not properly received by the receiving device. Responsive to the SACK message, the lost or corrupted PDU is retransmitted via a different path of the network, different from the path used to transmit the original PDU. Lost or corrupted PDUs may not be retransmitted if the estimated retransmission delay is greater than a delay tolerance associated with the quality of service requirements of the application. Instead, a control message (i.e. "cut losses" message) may be transmitted to indicate that PDUs earlier than a particular sequence number will not be transmitted.

37 Claims, 11 Drawing Sheets

(56) References Cited

U.S. PATENT DOCUMENTS

| | | | |
|---|---|---|---|
| 6,473,399 | B1* | 10/2002 | Johansson et al. ............ 370/229 |
| 7,636,342 | B2 | 12/2009 | Tang |
| 7,724,640 | B2* | 5/2010 | Larsson ........................ 370/216 |
| 8,090,857 | B2 | 1/2012 | Yonge, III |
| 8,443,247 | B2* | 5/2013 | Duan et al. .................... 714/748 |
| 2005/0213533 | A1* | 9/2005 | Jin ................................ 370/328 |
| 2006/0098574 | A1 | 5/2006 | Yi et al. |
| 2007/0047452 | A1 | 3/2007 | Lohr et al. |
| 2008/0298322 | A1* | 12/2008 | Chun ..................... H04L 1/1635 370/335 |
| 2009/0168701 | A1 | 7/2009 | White et al. |
| 2009/0310578 | A1 | 12/2009 | Convertino et al. |
| 2010/0046520 | A1* | 2/2010 | Nakata ................. H04L 1/1867 370/394 |
| 2010/0226265 | A1 | 9/2010 | Zhang et al. |
| 2010/0278062 | A1 | 11/2010 | Abraham et al. |
| 2011/0280329 | A1 | 11/2011 | Yonge, III |
| 2011/0281570 | A1* | 11/2011 | Shi ......................... H04W 24/10 455/418 |
| 2012/0057522 | A1 | 3/2012 | Van Wyk et al. |
| 2012/0226802 | A1* | 9/2012 | Wu et al. ..................... 709/224 |
| 2012/0327951 | A1 | 12/2012 | Sgouros et al. |

OTHER PUBLICATIONS

European Standard Final Draft FprEN 50561-1: "Power line communication apparatus used in low-voltage installations—Radio disturbance characteristics—Limits and methods of measurement—Part 1: Apparatus for in-home use," ICS 33.040.60, Aug. 2012, pp. 1-26.

Keshav S., et al., "SMART Retransmission: Performance with Overload and Random Losses," Jan. 26, 1996, pp. 1-12.

Piecuch M., et al., "A Selective Retransmission Protocol for Multimedia on the Internet," in Proceedings of SPIE Multimedia Systems and Applications, Nov. 2000, 12 pages.

"International Application No. PCT/US2014/021585 Partial Search Report", Aug. 6, 2014, 7 pages.

El Al, et al., "Improving interactive video in ad-hoc networks using path diversity", Mobile Ad-Hoc and Sensor Systems, 2004 IEEE International Conference 0 N Fort Lauderdale, FL, USA Oct. 25-27, 2004. Piscataway. NJ. USA.IEEE. US,, Oct. 25, 2004, pp. 369-378.

"PCT Application No. PCT/US2014/021585 International Search Report", Nov. 10, 2014, 17 pages.

Shacham, Nachum, et al.,"A Selective Repeat ARQ Protocol for Parallel Channels and Its Resequencing Analysis", Computer Communication Technologies for the 90's, Elsevier Science Publishers B.V. (North-Holland), 1988. pp. 259-264.

"PCT Application No. PCT/US2014/021585Written Opinion", May 19, 2015, 4 pages.

"PCT Application No. PCT/US2014/021585 International Preliminary Report on Patentability", Jul. 17, 2015, 15 pages.

* cited by examiner

ENHANCED ACKNOWLEDGEMENT AND RETRANSMISSION MECHANISM

BACKGROUND

Embodiments of the inventive subject matter generally relate to the field of network communications, and, more particularly, to transmission acknowledgements and retransmissions of unacknowledged transmissions.

A hybrid network (such as a Convergent Digital Home Network (CDHN), or P1905.1 network) is typically formed by interconnecting communication networks across different network technologies and communication media. The hybrid network may include hybrid communication devices (referred to herein as "hybrid devices") that are often multi-interface and capable of operating across multiple networking technologies. A hybrid device (HD) may or may not have multiple interfaces but is considered a hybrid device if it is configured to use protocols associated with multi-interface devices in a hybrid network. For example, each hybrid device may support multiple interfaces using different network technologies (e.g., Ethernet, IEEE 802.11 WLAN, Coax, and powerline communications (PLC), etc.).

IEEE P1905.1 draft standard defines an abstraction layer (AL) for multiple home network technologies that provides a common interface to several popular network technologies: IEEE 1901 over power lines, IEEE 802.11 for wireless, Ethernet over twisted pair cable and MoCA 1.1 over coax. In this disclosure, a HD is considered P1905.1 compliant if it includes the IEEE P1905.1 abstraction layer and associated protocols. The abstraction layer typically has a unique medium access control (MAC) address that is in addition to the interface layer (IL) MAC addresses associated with each interface of the HD. The P1905.1 protocol defines messages, such as the Topology Discovery Message, Topology Query/Response messages, or other messages communicated between hybrid devices to share information about the topology of the hybrid network.

In a hybrid network with multiple hybrid devices, there may exist a plurality of different paths from a source hybrid device to a destination hybrid device. A first device may send a packet stream to a second device via the hybrid network. There is a potential for out-of-order packet delivery at a destination device due to packets transmitted via a different paths or due to load balancing among multiple paths. Reliable delivery of packets may be desirable for a packet stream. A first application associated with a packet stream may have different delay tolerance than a second application.

SUMMARY

Various embodiments are disclosed for enhanced acknowledgement and selective retransmission of lost or corrupted protocol data units (PDUs) associated with a packet stream.

In one embodiment, a series of protocol data units (PDUs) are transmitted from a first device via at least a first path of a network to a second device. The series of PDUs include media access control (MAC) layer sequence numbers. A selective acknowledgement (SACK) message is received from the second device, the SACK message indicating at least one sequence number of a lost or corrupted PDU which was not properly received by the second device. Responsive to the SACK message, the lost or corrupted PDU is retransmitted via a second path of the network, different from the first path, to the second device.

In another embodiment, one or more particular lost or corrupted PDUs are not retransmitted if the estimated retransmission delay is greater than a delay tolerance associated with the quality of service requirements of the series of PDUs. Instead, a control message (i.e. "cut losses" message) may be transmitted to indicate that PDUs earlier than a particular sequence number will not be transmitted.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
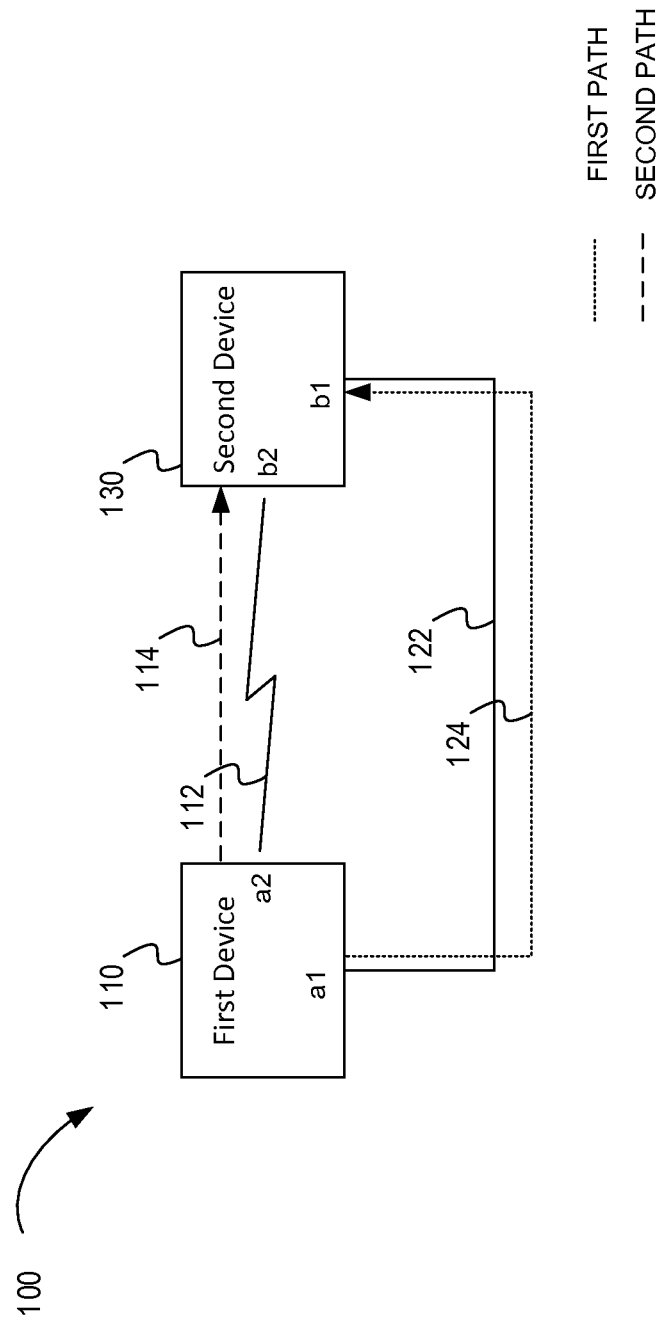
FIG. 1 is an example system diagram illustrating sequence numbering, selective acknowledgment, and retransmission in accordance with an embodiment of the present disclosure.

The description that follows includes exemplary systems, methods, techniques, instruction sequences and computer program products that embody techniques of the present inventive subject matter. However, it is understood that the described embodiments may be practiced without these specific details. For instance, although examples refer to hybrid network configurations, the methods and apparatus for enhanced acknowledgement and retransmission taught in this disclosure may also be used in other networks, including other path-diverse, mesh, and/or multi-hop connections between any two devices. In some embodiments, the retransmission mechanisms taught may also be applicable to singlehop, single-path communication connections between two devices. In other instances, well-known instruction instances, protocols, structures and techniques have not been shown in detail in order not to obfuscate the description.

In networking environments, a packet stream is made up of a series of packets associated with a particular application or session. For example, multimedia applications having voice or video may utilize a plurality of packets transmitted via a network from a source to one or more destinations. In some networking environments, a packet stream may be transmitted via a variety of different networking technologies. A protocol stack may be used to represent the various protocols and technologies involved in the transmission of a packet stream.

In some implementations, application layer data may be encapsulated in protocol data units (PDUs) associated with lower layers. One example of a commonly used protocol that may be used over a variety of different physical layer media is Ethernet. Ethernet frames may be transmitted, for example, over wireless local area networks (WLAN, such as IEEE 802.11), wired Ethernet, powerline communications (PLC), among others. It should be understood that Ethernet is similar to IEEE 802.3 which has a length field and typically followed by an 802.2 LLC header. In this disclosure, Ethernet frames as described as a non-limiting example layer two protocol compatible with the described embodiments. Other protocols are also envisioned, including other layer two protocols such as IEEE 802.3 or the like.

An application generating a packet stream may have requirements regarding reliability, latency, packet loss, or other quality of service characteristics. Typically, it is preferred to minimize latency, and maintain packet loss below a maximum loss tolerance associated with the application. Furthermore, it is desirable, when possible, to minimize additional control overhead, packet retransmissions, and signaling. Additional control overhead may be associated with additional control information transmitted, such as encapsulation with header, and/or it may take the form of additional processing, such as frame reassembly or deep packet inspection (e.g., looking at higher layer headers buried in the frame).

At a higher level, packet routing used to route packets of a packet stream may be performed at a network layer of the protocol stack. However, in home networking environments (such as a hybrid communication network), some path selection and path update processes have been handled at a lower layer—specifically the media access control (MAC) layer. The MAC layer may be used to provide a transparent network service. Ethernet frames are an example of MAC protocol data units (MPDUs) encapsulating upper layer packets. MPDUs may be sent via physical layer protocol data units (PPDUs) using a variety of physical layer (PHY) technologies. In accordance with this disclosure, the MAC layer may also be improved to allow for path splitting, packet sequencing, selective acknowledge of MPDUs, and retransmission. In this disclosure, a path refers to one or more communications segments from a first device to a second device. For example, a one-hop path may refer to a single communications connection via a media directly coupling two devices. A path may include two or more segments, such as when a relay device receives MPDUs from a first device and then relays (by retransmitting) the MPDUs to a second device. A path may or may not be related to a particular communications medium. For example, a first segment in a path may include a first communications medium (e.g. from a first device to a relay device), while a second segment in the path may include a different communications medium (e.g. from the relay device to a second device). In some embodiments, a path may refer to a route used to communicate PDUs from a first node to a second node.

PDUs (such as MPDUs or PPDUs) may be retransmitted if the PDU is not properly acknowledged in a selective acknowledgement message. In one embodiment, the retransmitted PDU may be sent via a second path that is different from the original path previously used to transmit the PDU. For example, the retransmitted PDU may be sent via a different path having a lower latency, less congestion, or reserved bandwidth. In some scenarios, retransmitting a lost PDU is futile due to the application delay tolerance. Therefore, in one embodiment, a device may transmit a control message (i.e. "cut losses" message) to indicate to the recipient that it should move on without waiting for retransmitted packets earlier than a particular sequence number.

FIG. 1 is an example system diagram 100 illustrating sequence numbering, selective acknowledgment, and retransmission in accordance with an embodiment of the present disclosure. In the example system 100, a first device 110 and a second device 130 are coupled to each other via two different communications medium, a wireless local area network (WLAN) medium 112 and a wired medium 122 (such as powerlines, coax, or twisted pair Ethernet). The first device 110 is coupled to the wired medium 122 via a first interface a1 and coupled to the WLAN medium 112 via a second interface a2. Similarly, the second device 130 is coupled to the wired medium 122 via a first interface b1 and coupled to the WLAN medium 112 via a second interface b2.

In FIG. 1, the first device 110 is communication a packet stream to the second device 130. The packet stream comprises a series of PDUs that may be communicated by a MAC layer (not shown) of the first device 110, via a network interface and coupling communication medium to a destination MAC layer (not shown) of the second device 130. FIG. 1 illustrates two paths over which that the PDUs may be communicated to the second device 130. A first path 124 traverses the wired medium 122 and a second path 114 traverses the WLAN medium 112.

The packet stream from first device 110 to the second device 130 may require more bandwidth than is available on a single path between the first device 110 and the second device 130. For example, the packet stream may require 20 Mbps, but the first path 124 (e.g. via a powerline communications path) may only provide 15 Mbps in an example system. The second path 114 (e.g. via a WLAN path) may only provide 10 Mbps in the example system. In that scenario, neither the first path 124 nor the second path 114 may be capable by itself of carrying the full bandwidth needed for the packet stream. Therefore, it may be possible to send MAC layer PDUs via both paths from the first device 110 to the second device 130. Packet stream splitting (also sometimes referred to as load balancing) may be used to communicate PDUs via a plurality of different paths to a destination device. However, the destination device must make sure the PDUs are delivered to upper layers in a proper order and within delay tolerance associated with the packet stream application. For some applications, lost PDUs may be omitted as long as the number of lost PDUs does not exceed the loss tolerance.

To aid the destination device in reordering PDUs, sequence numbers may be included in the PDUs. This disclosure includes a variety of techniques which may be used to convey sequence numbers with PDUs, such as Ethernet frames. The sequence numbers may be used by the destination device to identify the proper ordering of the PDUs, as well as identify any lost or corrupt PDUs.

Referring to the example system 100 of FIG. 1, the first device 110 may insert sequence numbering into the PDUs sent via either the first path 124, the second path 114, or both the first and second paths 114, 124. There may be a number of ways that sequence numbers could be conveyed from a source device to a destination device, including the different non-limiting alternatives described in this disclosure.

As described previously, a packet stream may be transported as a multi-path stream having PDUs delivered via two or more paths in a network. Various control messages may be used to support the establishment or modification of a multi-path stream. For example, a source device (such as first device 110) and receiving device (such as second device 130) may negotiate multi-path stream handling capabilities. In one implementation, starting sequence numbers may be synchronized during multi-path stream establishment. Additional link metric information or path discovery may be used to determine path latency or throughput. In some networks, feedback from a receiving device may be used to modify the multi-path stream parameters. For example, feedback from the receiving device could be used to determine which path of two or more paths has a lower latency or higher throughput. A lower latency or higher throughput path may be used for PDU retransmissions. In some embodiments, the connection is established, maintained, and terminated in any of the manners well known to one versed in the art.

In one embodiment, a transmitting source device may schedule transmission of Ethernet frames based upon relative latency associated with the two or more paths. For example, frames sent over low latency paths may be scheduled with delay so that they are expected to arrive in approximate order with those frame sent over higher latency paths. At the receiving destination device, frames that are received out of order may be buffered until they can be properly delivered to higher layers in order. The time period for buffering out of order frames may be limited based upon a maximum tolerable delay.

The first device 110 and the second device 130 maintain a register of sequence numbers associated with the packet stream. The sequence numbering is useable by the second device 130 to reorder the received PDUs prior to sending to upper layers. Additionally, the sequence numbers provide an identification that the second device 130 may use to indicate which PDUs are received correctly or which are lost or corrupted. For example, the second device 130 may send a selective acknowledgement (SACK) message to the first device 110, the SACK message identifying the lost or corrupted PDUs. The SACK message may be specific to the PDUs received on one of the paths, or may be a combined SACK message for sequence numbers regardless of which path is used. The SACK message is described in more detail in FIG. 6.

In accordance with this disclosure, Selective ACKs (SACKs) may be sent as P1905.1 control frames. Selective ACKs provide a tool for a receiver to indicate a plurality of received or missing frames in one response message. The SACK message defined in this disclosure is versatile so that multiple frame sequence numbers (according to a bit map) may be indicated in a small SACK message. Furthermore, the SACK message provides flexibility to indicate which specific frames are received in a group of sequence numbers. The SACK may be variable in length, to cover as much of the stream as is in doubt at the receiver.

By interpreting the SACK message, the first device 110 may determine which PDUs are lost or corrupted and determine whether to retransmit the lost or corrupted PDUs. Responsive the receiving the SACK message, the first device 110 may determine whether or not to retransmit a lost or corrupted PDU. For example, if the retransmission delay or estimated arrival of a retransmitted PDU is more than a delay tolerance associated with a packet stream, then the first device 110 may determine not to retransmit the lost or corrupted PDU. Instead, the first device 110 may ignore the SACK message with regard to a particular sequence number or may send a control message to indicate to the second device 130 that sequence numbers earlier than a particular sequence number are not eligible for retransmission.

Responsive to receiving the SACK message, the first device 110 may optionally retransmit the lost or corrupted PDU or may send the control message to indicate that PDUs earlier than a particular sequence number will not be retransmitted.

In one embodiment, the acknowledgement feedback and retransmission of PDUs may be coordinated among two or more paths from the first device 110 to the second device 130. For example, a SACK message (or NACK message) from the receiver to the sender may be associated with identifying lost PDUs over a high latency path (such as first path 124). The lost PDUs may be retransmitted over a lower latency path (such as second path 114) from the sender to the receiver. The retransmission may be sent via a different path from the first transmission. Since the first device 110 is aware of the first path used for the original transmission, it can select a second path for the retransmission. In some embodiments, a selected second path may be chosen based on lower latency, lower congestion, reserved bandwidth, or other factors as compared to the first path.

In one variation, a signal from the first device 110 may indicate to the receiver to perform certain actions, such as: proceed with delivering buffered frames, drop the buffered frames, or reset the sequence numbering window. For example, the control message may serve as a "cut losses" message to indicate to the receiver that frames earlier than a particular sequence number will not be retransmitted. The receiver may then selectively proceed with delivering buffered frames before the particular sequence number, and any other frames which sequentially follow. This may prevent the first device 110 from having to retransmit several earlier lost or corrupted PDUs, which may have already expired in terms of the application delay tolerance criteria.

Figure 2:
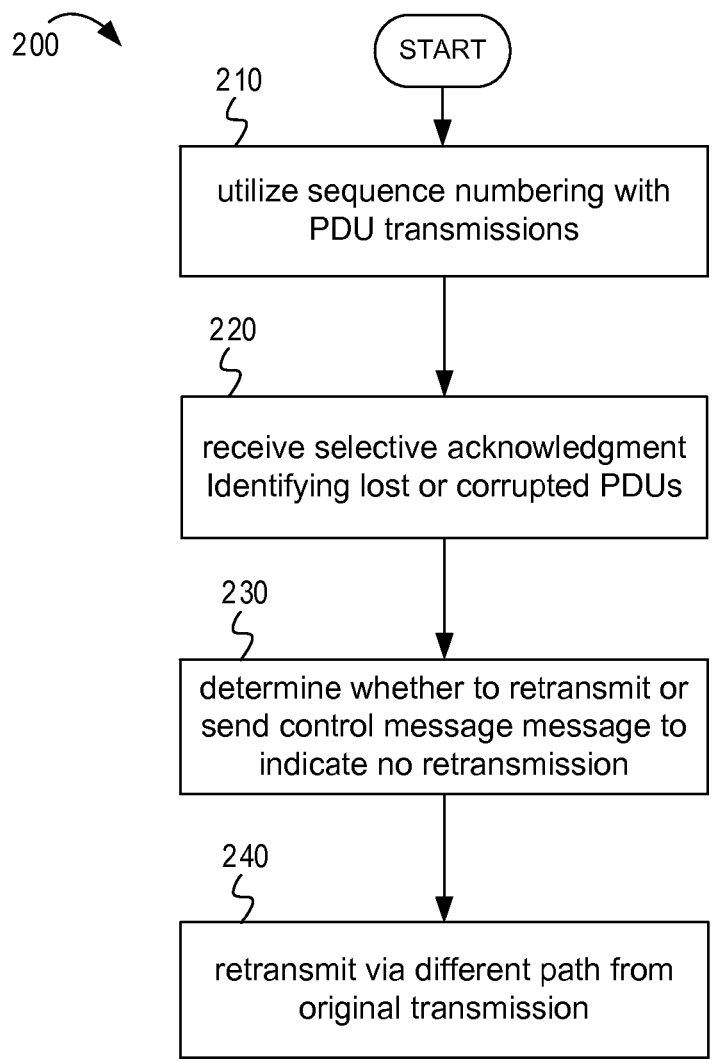
FIG. 2 is a flow diagram illustrating example operations for a source device implementing enhanced acknowledgement and retransmission in accordance with an embodiment of the present disclosure.

FIG. 2 illustrates a high level flow chart 200 in accordance with an embodiment of the present disclosure. At 210, a first device utilizes sequence numbering with PDU transmissions. For example, the first device may insert sequence numbering into the PDUs as the PDUs are generated or transmitted. The sequence numbering may be useable by a second device to determine lost or corrupt PDUs or to reorder the received PDUs prior to sending to upper layers. At 220, the first device receives a selective acknowledgment message from the second device, the selective acknowledgement message identifying lost or corrupt PDUs. At 230, the first device may determine which PDUs are lost or corrupted and determine whether to retransmit the lost or corrupted PDUs. Alternatively (or in addition to retransmitting the lost PDU), the first device may send a control message to indicate that PDUs earlier than a particular sequence number will not be retransmitted. At 240, the first device may optionally retransmit the lost or corrupted PDU via a different path from a path used for the original transmission of the corresponding PDU.

Figure 3:
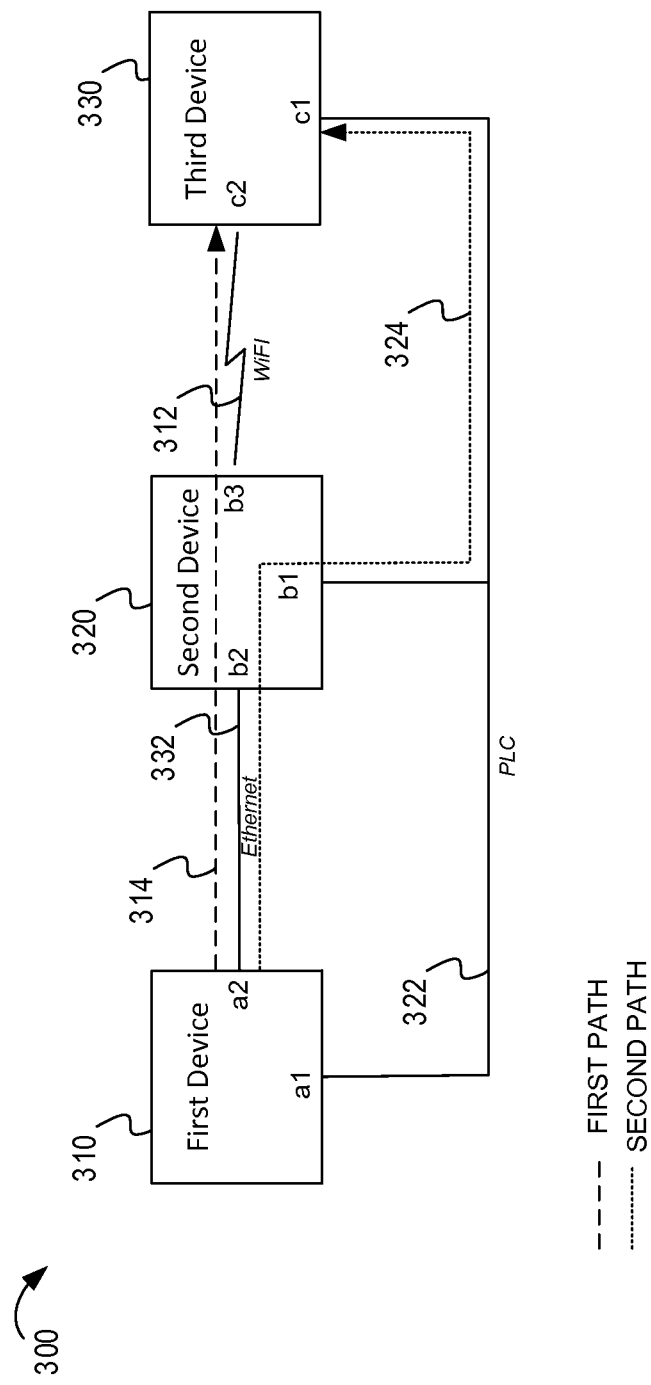
FIG. 3 is an example system diagram illustrating a multi-hop hybrid network implementing enhanced acknowledgement and retransmission in accordance with an embodiment of the present disclosure.

FIG. 3 illustrates another example system 300 involving a multi-hop hybrid network. The example system 300 may also be capable of implementing enhanced acknowledgement and retransmission in accordance with an embodiment of the present disclosure. In FIG. 3, a hybrid network includes a first device 310, a second device 320, and a third device 330. Similar to the description of FIG. 1, the devices 310, 320, 330 have various interfaces coupled to various communications medium. For example, a powerline communications medium 322 is coupled to first device 310 at interface a1, to second device 320 at interface b1, and to third device 330 at interface c1. An Ethernet wired media 332 is coupled to first device 310 at interface a2 and to second device 320 at interface b2. A WLAN media 312 is coupled to second device 320 at interface b3 and to third device 330 at interface c2. It should be understood that the example communications medium depicted in FIG. 3 are provided as examples only, and that other mediums could be used in other example implementations.

In the example of FIG. 3, the first device 310 is communicating a packet stream via a first path 314 and a second path 324. In the Figures, the paths are represented by arrows shown adjacent to the communications medium (solid lines). However, it should be understood that the packet stream represented by the arrows are transmitted via the communications medium. Determination of the link capacities, link metrics (such as delay, throughput, etc.), and path selection variables may be communicated amongst the devices using P1905.1 control messages or other topology discovery protocols.

In one example, the first and second paths 314, 324 may be associated with independent sequence numbering for each hop of the path. For example, a first sequence number range may be used for the first hop from a2 to b2 used in the first path 314. A second sequence number range may be used for the second hop from b3 to c2 used in the first path 314. Alternatively, the sequence numbering for each path may be end-to-end with the sequence numbers being passed through by second device 320 acting as a relay.

Typically, the sequence numbering for each PDU of the packet stream may be unique among the PDUs for the packet stream. In other words, a sequence number used in a PDU transmitted via the first path 314 will not be reused for a PDU transmitted via the second path 324. This allows the destination device (third device 330) to reorder the PDUs properly without overlapping sequence numbers. However, in some implementations, the paths may utilize separate sequence number ranges to treat each path separately in separate SACK messages. Overhead messages or marker frames may be used to correlate the relationship (i.e. ordering) from the two ranges of sequence numbering.

Figure 4:
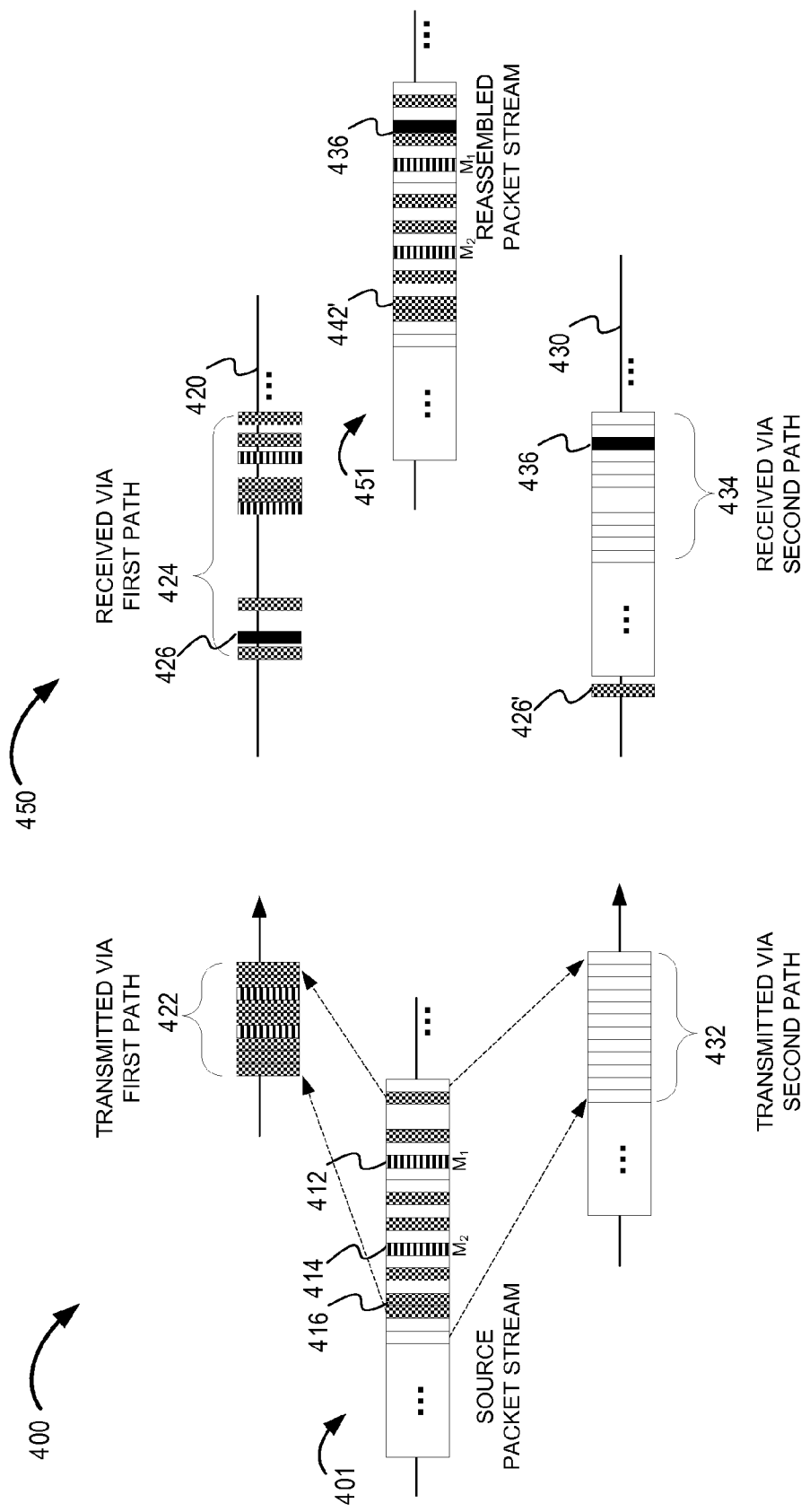
FIG. 4 is a conceptual packet timing diagram illustrating packet handling in accordance with an embodiment of the present disclosure.

FIG. 4 is a conceptual packet timing diagram illustrating packet handling in accordance with an embodiment of the present disclosure. The conceptual packet timing diagram includes a transmitting side 400 (on the left side of FIG. 4) that shows source packet stream 401 being sent from a transmitting device. The conceptual packet timing diagram includes a receiving side 450 (on the right side of FIG. 4) that shows PDUs received at a receiving device configured to prepare a reassembled packet stream 451.

At the transmitting side 400, the source packet stream 401 is presented to a MAC layer (not shown) of a first device, such as first device 110, 310. The source packet stream 401 includes a first subset of PDUs 422 that are shaded (e.g. data PDU 416 and marker PDUs 414, 412) in the conceptual view of the source packet stream 401. The first subset of PDUs 422 are transmitted via a first path. In one example embodiment, the marker PDUs are added by the MAC layer to provide overhead information and/or synchronization of the sequence numbering. The source packet stream 401 also includes a second subset of PDUs 432 that are transmitted via a second path of the network. It should be understood that the PDUs are typically transmitted in the order they occur in the source packet stream 401. However, the PDUs may be transmitted out of order in some cases, or may be transmitted as segmented blocks or as concatenated blocks. Sequence numbering (not shown) is added to each of the PDUs to provide for acknowledgement by the second device, as well as packet reordering at the second device.

At the receiving side 450, the first subset of PDUs 424 are received via a first path 420. It is noted that the received first subset of PDUs 424 may not be received with the same timing synchronicity with which they were transmitted (compared to timing of the transmitted first subset of PDUS 422). Also, one of the PDUs, PDU 426, is missing, lost, or corrupted. The receiving device may send back a SACK message to the transmitter identifying the missing sequence number associated with missing PDU 426 and indicating that the missing PDU 426 was not properly received.

The second subset of PDUs 434 are received via second path 430 at the receiving side 450. In the second subset of PDUs 434 are missing PDU 436. The receiving device may send back a SACK message to the transmitter identifying the missing sequence number associated with missing PDU 436 and indicating that the missing PDU 436 was not properly received. It should be noted that in some embodiments the same SACK message may be used to indicate missing PDUs 426 and 436.

Responsive to receiving the SACK message, the transmitting device may determine whether to retransmit the missing PDUs 436, 426. In the example of FIG. 4, the transmitting device determines that the estimated retransmission delay associated with PDU 436 would result in unacceptable performance for the application. For example, the delay for the retransmitted PDU 436 may be outside of a tolerable delay threshold for the application associated with the source packet stream. As a non-limiting example, the application may be a multimedia, voice over ip, or other near-real-time communication which can tolerate a missing PDU better than it can tolerate a delayed PDU. The transmitting device may however determine to retransmit the missing PDU 426. In the example of FIG. 4, the transmitting device retransmits the missing PDU 426 as PDU 426' via the second path 430. The transmitting device may have determined to retransmit the missing PDU 426' via the second path 430 if the second path 430 is associated with less delay, less congestion, better reliability, or other factors.

In one embodiment, an indicator included with the retransmitted PDU 426' may also indicate to the receiver that PDU 436 will not be retransmitted. For example, the indicator may be a control message, a header, MAC protocol extension, or other indicator that identifies that no PDU's earlier than PDU 426 will be retransmitted.

The receiving device reassembles the packet stream for delivery to upper layers. In the reassembled packet stream 451, missing PDU 436 may be eliminated from the packet stream, while the missing PDU 426 may be replaced by retransmitted PDU 426'. In some embodiments, the MAC layer may present the reassembled packet stream to a link layer control (LLC) sublayer with an indication to cause the LLC to overlook the missing PDU 436.

FIG. 4 also shows an optional feature of marker PDUs 414, 412. The marker PDUs are also sometimes referred to as marker frames or marker packets. As data PDUs are sent over selected paths, separate marker PDUs may be injected in the stream of PDUs (e.g. a marker PDU added every N application PDUs). The marker PDUs may include one or more sequence numbers associated with the stream of PDUs. For example, each marker PDU provides sequence number range for PDUs sent on same path. A marker PDU may contain frame fingerprints to match PDUs with sequence numbers. Marker PDUs may also contain information from prior marker PDUs for redundancy (in case a marker PDU is lost). Marker PDUs may contain information about the path that the next group of PDUs will take. For example, path switch marker PDU may indicate the beginning or end of a path update where transmitting device is switching from a first path to a second path. Marker PDUs can be used for networking environments in which the data PDUs cannot be modified. In other words, marker PDUs do not require the addition of headers or tags to existing data PDUs associated with a packet stream.

In one example embodiment, the PDUs represent Ethernet frames. The Ethernet frames sent via a selected path may be updated with sequence numbers added in a tag field of each Ethernet frame. For example a specific virtual local area network (VLAN) tag may be used or a reserved Ethertype may be used as a field extension. For example, IEEE 802.1q defines a header that can be used in an Ethernet frame to indicate a VLAN ID. IEEE 802.1ad defines a second header that can be used for double tagging an Ethernet frame. In accordance with this disclosure, the format of the headers in Ethernet may be redefined in a particular networking environment so that a sequence number may be included in each Ethernet frame.

If VLAN tags are used for sequence numbers, an indication in the VLAN tag may be used to indicate that the VLAN tag represents a sequence number. For example, a bit flag may be set (or unset) if the VLAN tag is repurposed for sequence numbers and unset (or set) if the VLAN tag is available for other use (such as a VLAN ID or some other overloaded value). Other information may be conveyed via the VLAN tag. For example, out of a 16 bit field for a VLAN tag, the following structure may be defined: 1 bit to indicate sequence numbering scheme is used; 3 bits (e.g. the 3 most significant bits) for priority signaling; and 12 bits available for sequence number. Alternatively, the priority may be determined by other means, freeing those three bits for other purposes, such as longer sequence numbers. In one alternative embodiment, at least one bit may be reserved for indicating repair blocks. Another bit may be reserved as a flag to indicate that no older sequence numbers will be sent (i.e., receiver should skip any lost sequence numbers older than the sequence number in the present frame and proceed with ordered delivery of buffered frames up to this sequence number). Depending on the frame length, and assuming that there is one sequence number used per frame, then this should be sufficient for stream data rates over 24 Mbps (using 12 bits of sequence numbers out of the VLAN tag header) and maximum latency of 1 sec. Shorter frames may be used for lower data rate streams or shorter latencies.

If multiple VLAN tags are stacked, care may be taken that they are stacked in a particular order. In one embodiment, it may be desirable to register a unique Ethertype number from IANA so that there is no confusion over the meaning of the new field. The new field may be the same size (e.g. 16 bits) or structure as existing VLAN tag headers, but would be identified as a sequence number field in the Ethernet frame.

In one example embodiment, the PDUs represent IEEE802.2 (LLC) type 2 frames. IEEE 802.2 defines a Logical Link Control (LLC) protocol sublayer that is often used between a MAC layer and a network layer. The LLC sublayer presents a uniform interface to the network layer. Beneath the LLC sublayer is the Media Access Control (MAC) sublayer. LLC Type 2 is a connection-oriented operational mode. Sequence numbering ensures that the frames received are guaranteed to be in the order they have been sent, and no frames are lost. In one embodiment, the LLC sublayer may be told that all frames have been delivered even if some frames have been lost—such as when the missing frame is too old to retransmit for a loss tolerant application. In another embodiment, as the Ethernet frames are prepared for transmission, an LLC type 2 header may be added to include the sequence numbers for a particular MAC layer PDU stream.

Figure 5:
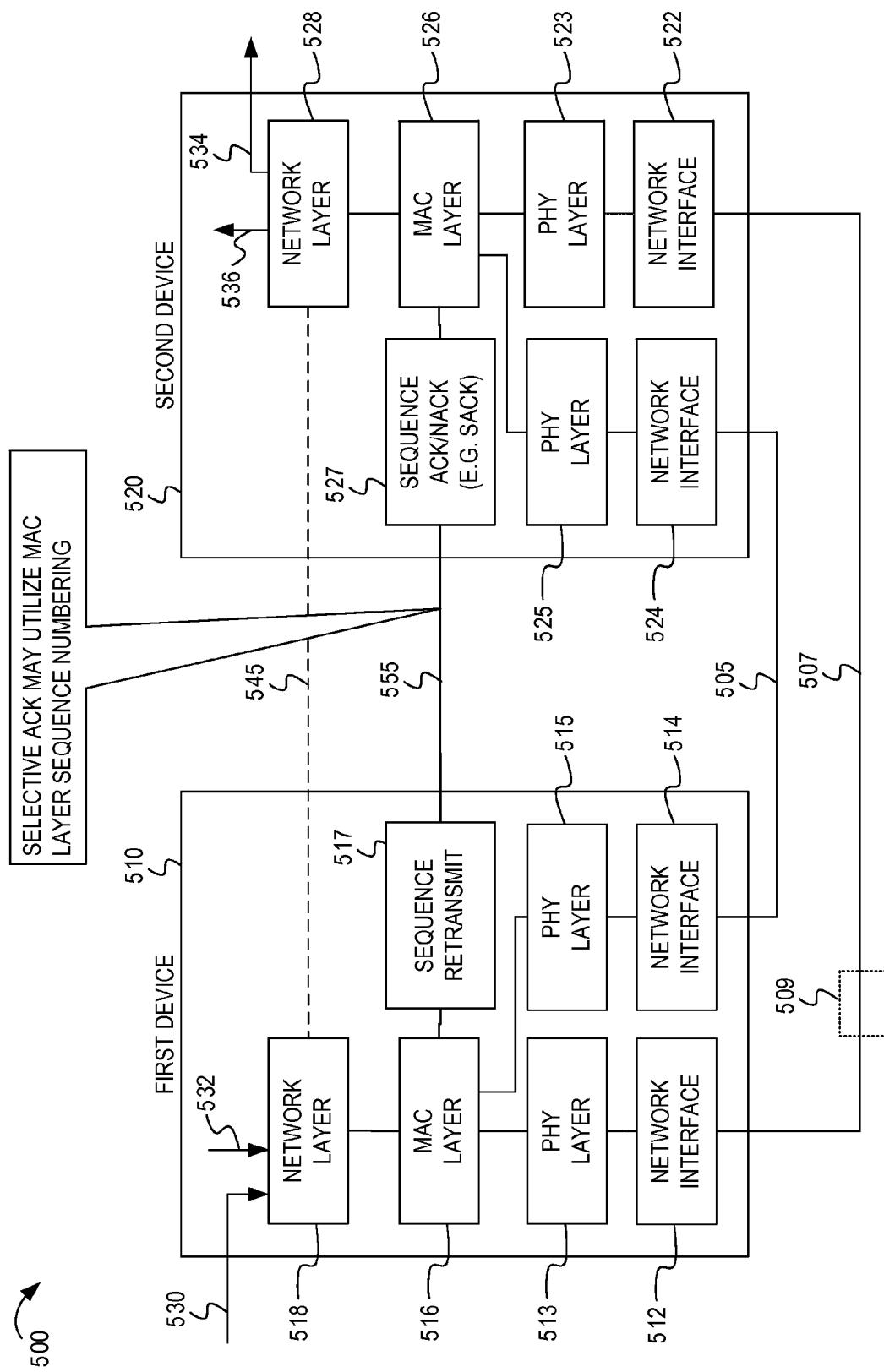
FIG. 5 is an example system diagram illustrating a protocol stack for handling enhanced acknowledgement and retransmission in accordance with an embodiment of the present disclosure.

FIG. 5 is an example system diagram 500 illustrating a first device 510 and a second device 520 configured to implement enhanced acknowledgement and retransmission in accordance with this disclosure. The first device 510 includes a protocol stack having a network layer 518, a media access control (MAC) layer 516, a first physical (PHY) layer 513 associated with a first network interface 512, and a second PHY layer 515 associated with a second network interface 514. The first device also includes a sequence retransmit unit 517 configured to maintain a register of sequence numbering for transmitted PDUs and to optionally retransmit PDUs that are not acknowledged by the second device. The first network interface 512 is coupled to a first communications medium 507 of a network. One or more relays 509 may be present on the first communications medium 507. The second network interface 514 is coupled to a second communications medium 505 of the network.

Similar to the first device 510, the second device 520 includes a protocol stack. The protocol stack of the second device 520 a network layer 528, a media access control (MAC) layer 526, a first physical (PHY) layer 523 associated with a first network interface 522, and a second PHY layer 525 associated with a second network interface 524. The second device 520 also includes a sequence acknowledgement unit 527 configured to maintain a register of sequence numbering for received PDUs and to send a selective acknowledgement message indicating sequence numbers for PDUs that are not properly received by the second device. The first network interface 522 is coupled to the first communications medium 507 of a network. The second network interface 524 is coupled to the second communications medium 505.

The first device 510 may be configured to receive routed network packets 530 from another device or application packets 532 from an upper layer (not shown). The packets 530, 532 may be sent from the network layer 518 via the MAC layer 516 to one of the physical layers 513, 515. In some implementations, the MAC layer 516 comprises an abstraction layer that coordinates communications via the separate PHY layers 513, 515 via interface layer MAC layers (not shown). As packets traverse down the protocol stack they may be segmented, blocked, or otherwise transformed into MAC layer PDUs (also referred to as MPDUs) and then to Physical layer PDUs (referred to as PPDUs). Similarly, reverse operations at the second device 520 may concatenate, reassemble, or otherwise transform PPDUs to MPDUs to packets. The second device 520 may represent an end device for application packets 536 or may route the packets 534 to another destination device.

Coordination between the network layers 518, 528 is represented by dashed line 545. Typically routing functions are performed at the network layers. Dashed line 555 represents correlation of sequence numbers between the sequence retransmit unit 517 and the sequence acknowledgement unit 527. Furthermore, the MAC layers 516, 526 may also coordinate by sharing physical layer topology information, link status, capacity, etc. In accordance with various embodiments described in this disclosure, the sequence acknowledgement unit 527 and the sequence retransmit unit 517 may coordinate the acknowledgement and retransmission of MPDUs based upon the MAC layer 516 sequence numbers. In some embodiments, a SACK message may include references to the MAC Layer sequence numbers to indicate reception (or lack thereof) of particular MPDUs.

In some embodiments of this disclosure, the coordination of sequence numbers, SACK messages, and retransmissions are performed at the MAC layer 516 of the OSI protocol stack. While transport control protocol (TCP) resides at the transport layer (not shown) above the network layers 518, 528, performing the acknowledgement and retransmit operations at the MAC layer may provide lower layer handling of PDU transmissions. In some embodiments, the network layers 518, 528 may be unaware that multiple physical layers or multiple communications medium are being used for selective diverse retransmission of lost or corrupt MPDUs.

Figure 6:
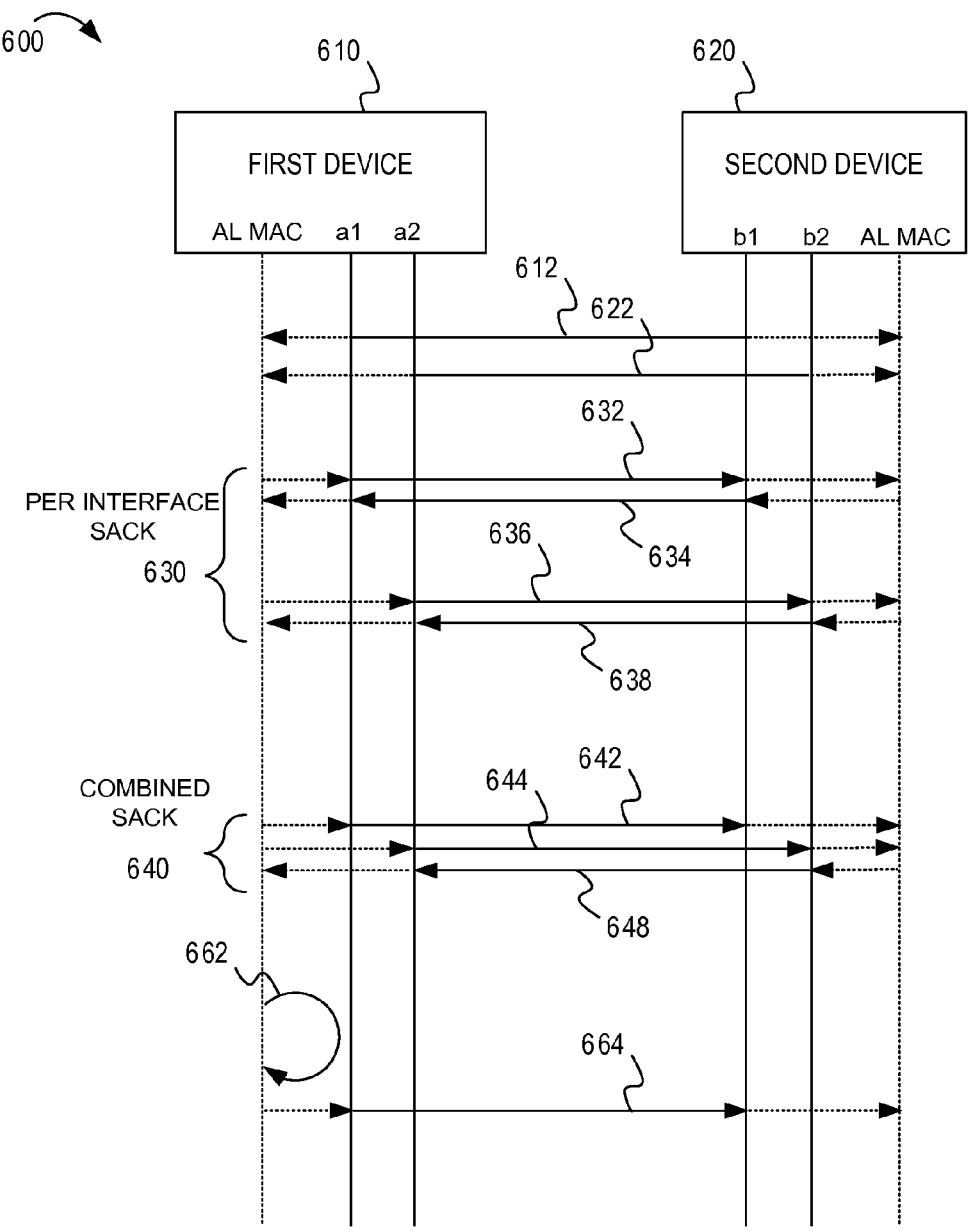
FIG. 6 is a message flow diagram illustrating variations for enhanced acknowledgement and retransmission in accordance with an embodiment of the present disclosure.

FIG. 6 is a message flow diagram 600 illustrating variations for enhanced acknowledgement and retransmission in accordance with an embodiment of the present disclosure. In the figure, messages are depicted as arrows having solid and/or dotted lines. Dotted lines refer to portions of a communication which involve an abstraction layer MAC (ALMAC) interface of a device, while solid lines refer to portions of a communication between physical interfaces.

A first device 610 includes two physical interfaces a1, a2 and an abstraction layer MAC layer. A second device 620 also includes two physical interfaces b1, b2 and an abstraction layer MAC layer. The interfaces a1, b1 are coupled by a first communications medium (not shown) and the interfaces a2, b2 are coupled by a second communications medium (not shown). Initially, at 612, messages exchanged via the first communications medium (via interfaces a1, b1) are used by the AL MAC of each device to discover topology and perform stream path selection. At 622, messages exchanged via the second communications medium (via interfaces a2, b2) are used by the AL MAC of each device to discover topology and perform stream path selection. In the examples shown in FIG. 6, a packet stream is split into two subsets of PDUs communicated via the two different communications medium.

At 630, a first example is illustrated in which each interface performs an independent selective acknowledgment protocol. At 632 a first PDU is communicated via the interface a1 of first device 610 to interface b1 of second device 620. The second device 620 sends a first selective acknowledgement message at 634 via the same interfaces b1 to a1. At 636 a second PDU is communicated via the interface a2 of first device 610 to interface b2 of second device 620. The second device 620 sends a second selective acknowledgement message at 638 via the same interfaces b2 to a2.

At 640, a second example is illustrated in which the devices utilize a combined selective acknowledgment protocol. At 642 a first PDU is communicated via the interface a1 of first device 610 to interface b1 of second device 620. At 644 a second PDU is communicated via the interface a2 of first device 610 to interface b2 of second device 620. In the example in FIG. 6, the second device 620 sends a combined selective acknowledgement message at 648 via the interfaces b2 to a2. It should be understood that the combined selective acknowledgement message could be transmitted using either path or connection. The combined SACK message may indicate missing sequence numbers for either or both of the first PDU (642) or the second PDU (644).

At 662, the first device 610 may analyze the SACK message(s) to determine any lost or corrupted PDUs and determine whether or not to retransmit the lost or corrupted PDUs. The retransmitted PDU is sent at 664 via one of the available interfaces. In one embodiment, the retransmitted PDU is sent via a different path than previously used to transmit the original corresponding PDU.

Having described independent and combined SACK messages, below is provided more detail regarding potential example information that may be included in SACK messages in accordance with this disclosure. In one embodiment the structure of a SACK message is a variable length encoding with the following fields:

Type=SACK

Length=length of SACK information in bytes (one byte)

Starting Sequence Number—highest sequence number covered by the SACK information (two bytes)

SACK Information—bitmap of ACKs (N bytes to ACK 8N sequence numbers)

No Higher ACK Flag—True if no higher sequence number has been received (i.e., the starting sequence number is the highest correctly received sequence number)

No Lower NAK (NLN) Flag—True if all sequence numbers lower than those covered by the SACK have either been received or skipped (i.e., there is no reason to send any frames for older sequence numbers than those covered by this SACK).

The flags defined in the SACK message may be useful for shorter SACK messages (such as when a large span of sequence numbers is in doubt). Another scenario where a flag is useful is when an older sequence number has been received or repaired, the NLN flag can indicate to the sender to mark all older sequence numbers (prior to the sequence number in the SACK message) as received. The sender can free retransmission buffers and can also move its send window up so more frames can be sent.

Example: If the receiver has received all sequence numbers from 0 to 4000 except for 3991, 3990, 3985, 3984, then the SACK may be coded as Length=3, Starting sequence number=4000, SACK Info=111111111001111001111111, NHA Flag=TRUE, NLN Flag=TRUE.

Figure 7:
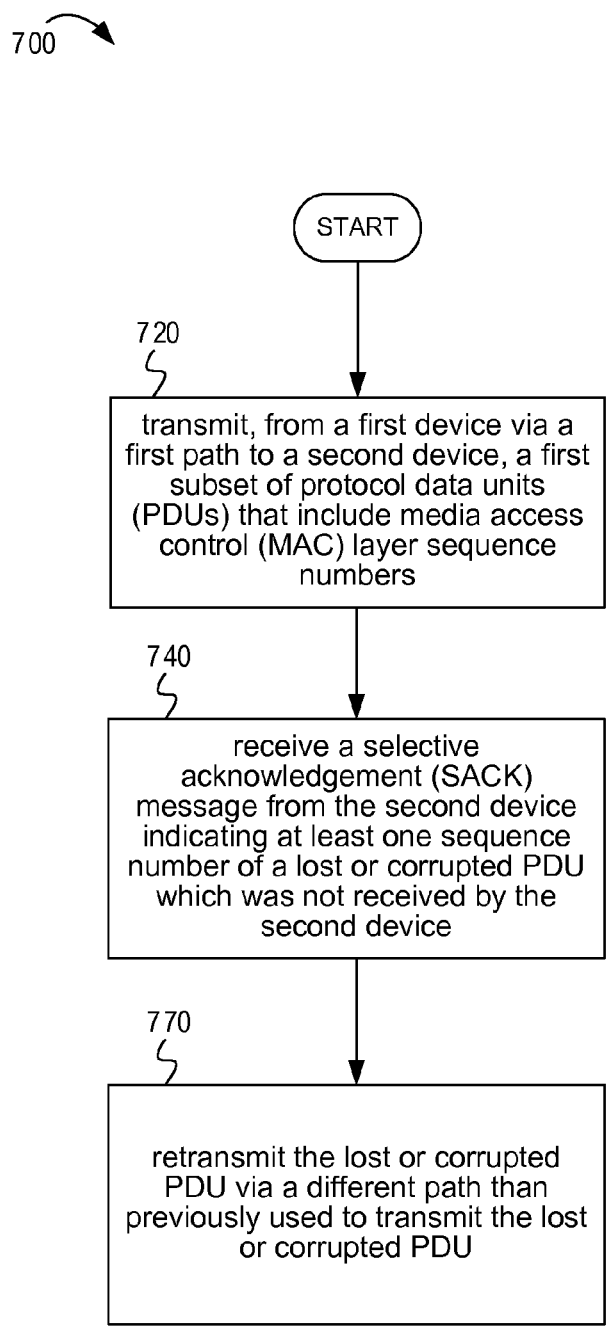
FIG. 7 is a flow diagram illustrating example operations for a source device implementing enhanced acknowledgement and retransmission in accordance with an embodiment of the present disclosure.

FIG. 7 is a flow diagram 700 illustrating example operations for a first device (such as first device 110, 310, 510, 610) implementing enhanced acknowledgement and retransmission. At 720, the first device transmits, from the first device via a first path to a second device, a first subset of protocol data units (PDUs) that include media access control (MAC) layer sequence numbers.

At 740, the first device receive a selective acknowledgement (SACK) message from the second device indicating at least one sequence number of a lost or corrupted PDU which was not received by the second device. At 770, the first device may retransmit the lost or corrupted PDU via a different path than previously used to transmit the lost or corrupted PDU.

Figure 8:
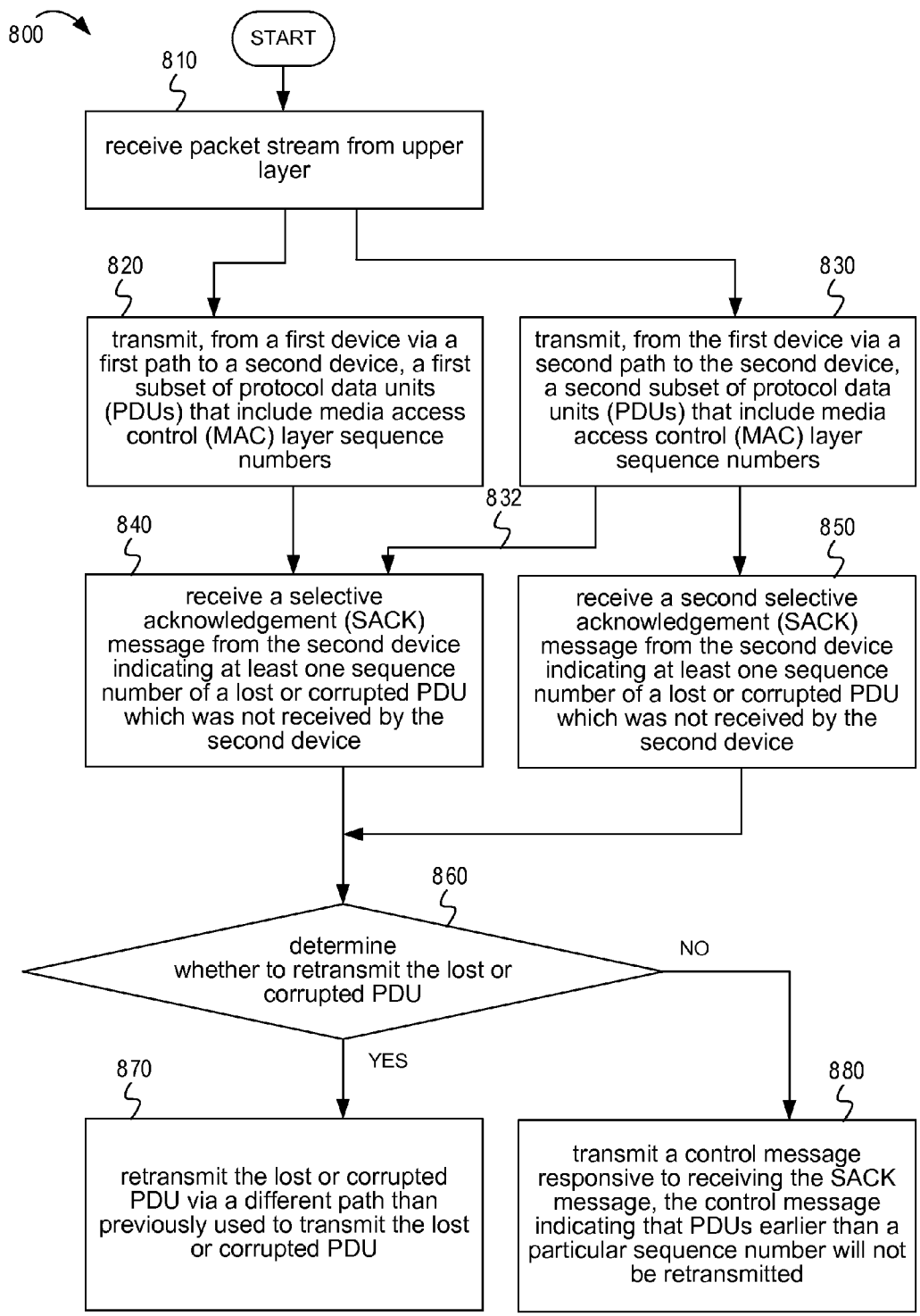
FIG. 8 is another flow diagram illustrating example operations for a source device implementing enhanced acknowledgement and retransmission in accordance with an embodiment of the present disclosure.

FIG. 8 is another flow diagram 800 illustrating example operations for a first device (such as first device 110, 310, 510, 610) implementing enhanced acknowledgement and retransmission in accordance with an embodiment of the present disclosure. At 810, the first device receives a packet stream from an upper layer. In an alternative implementation, the packet stream may be obtained via another device.

At 820, the first device transmits, from the first device via a first path to a second device, a first subset of protocol data units (PDUs) that include media access control (MAC) layer sequence numbers. Additionally, at 830, the first device may transmit, from the first device via a second path to the second device, a second subset of protocol data units (PDUs) that include media access control (MAC) layer sequence numbers.

At 840, the first device receive a selective acknowledgement (SACK) message from the second device indicating at least one sequence number of a lost or corrupted PDU which was not received by the second device. The SACK message may indicate only sequence numbers associated with PDUs transmitted at operation 820. Alternatively, the SACK message may also include (shown as arrow 832) sequence numbers associated with PDUs transmitted at operation 830. In another variation, at 850, the first device may receive a second selective acknowledgement (SACK) message from the second device indicating at least one sequence number associated with PDUs transmitted at operation 830 and indicating a lost or corrupted PDU which was not received by the second device.

At decision block 860, the first device may determine whether to retransmit the lost or corrupted PDU. If the first device determines to retransmit the lost or corrupted PDU, then at 870 the first device may retransmit the lost or corrupted PDU via a different path than previously used to transmit the lost or corrupted PDU. If the first device determines not to transmit the lost or corrupted PDU, then at 880 the first device may transmit a control message responsive to receiving the SACK message, the control message indicating that PDUs earlier than a particular sequence number will not be retransmitted.

Figure 9:
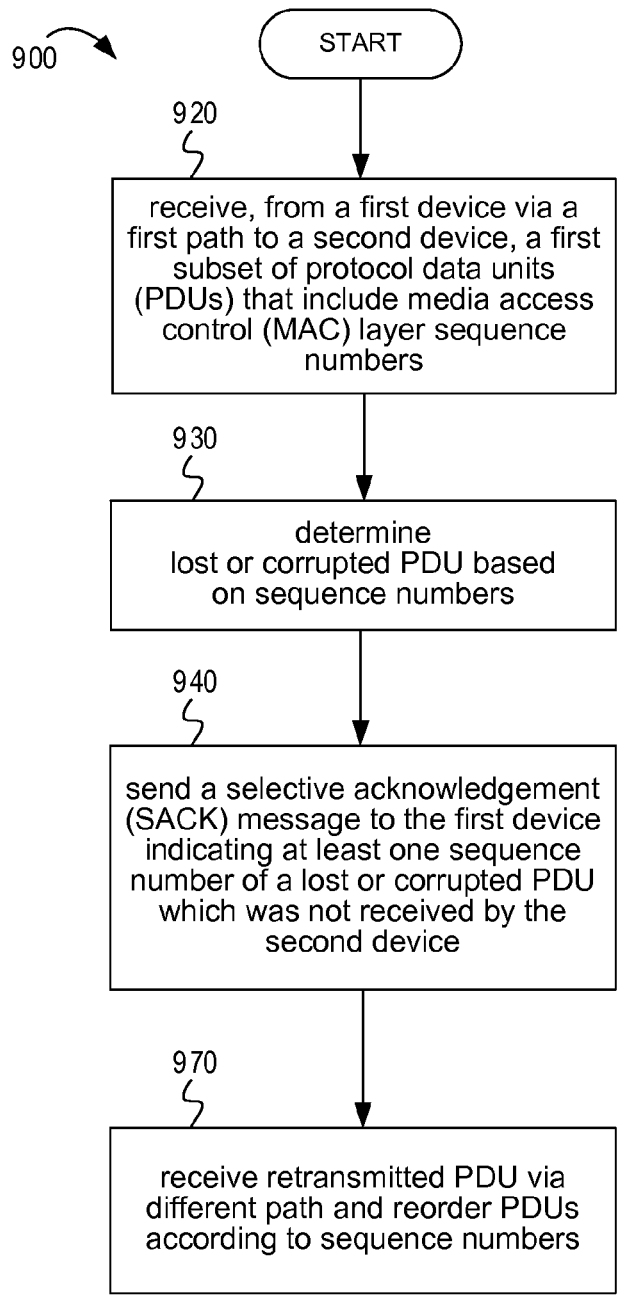
FIG. 9 is a flow diagram illustrating example operations for a destination device implementing enhanced acknowledgement and retransmission in accordance with an embodiment of the present disclosure.

FIG. 9 is a flow diagram 900 illustrating example operations for a second device (such as second device 120, 320, 520, 620) implementing enhanced acknowledgement and retransmission in accordance with an embodiment of the present disclosure. At 920, the second device may receive, from a first device via a first path to the second device, a first subset of protocol data units (PDUs) that include media access control (MAC) layer sequence numbers. At 930, the second device may determine whether there are any lost or corrupted PDU based on sequence numbers for any PDUs received via operations 920. For example, the second device may maintain a register, circular buffer, or other memory storage for maintaining a listing of received sequence numbers.

At 940, the second device may send a selective acknowledgement (SACK) message to the first device indicating at least one sequence number of a lost or corrupted PDU which was not received by the second device.

At 970, the second device may receive a retransmitted PDU (associated with the lost or corrupted PDU) via a second path different from the first path that was originally used by the first device to transmit the lost or corrupted PDUI. The second device may then reorder the PDUs according to sequence numbers.

Figure 10:
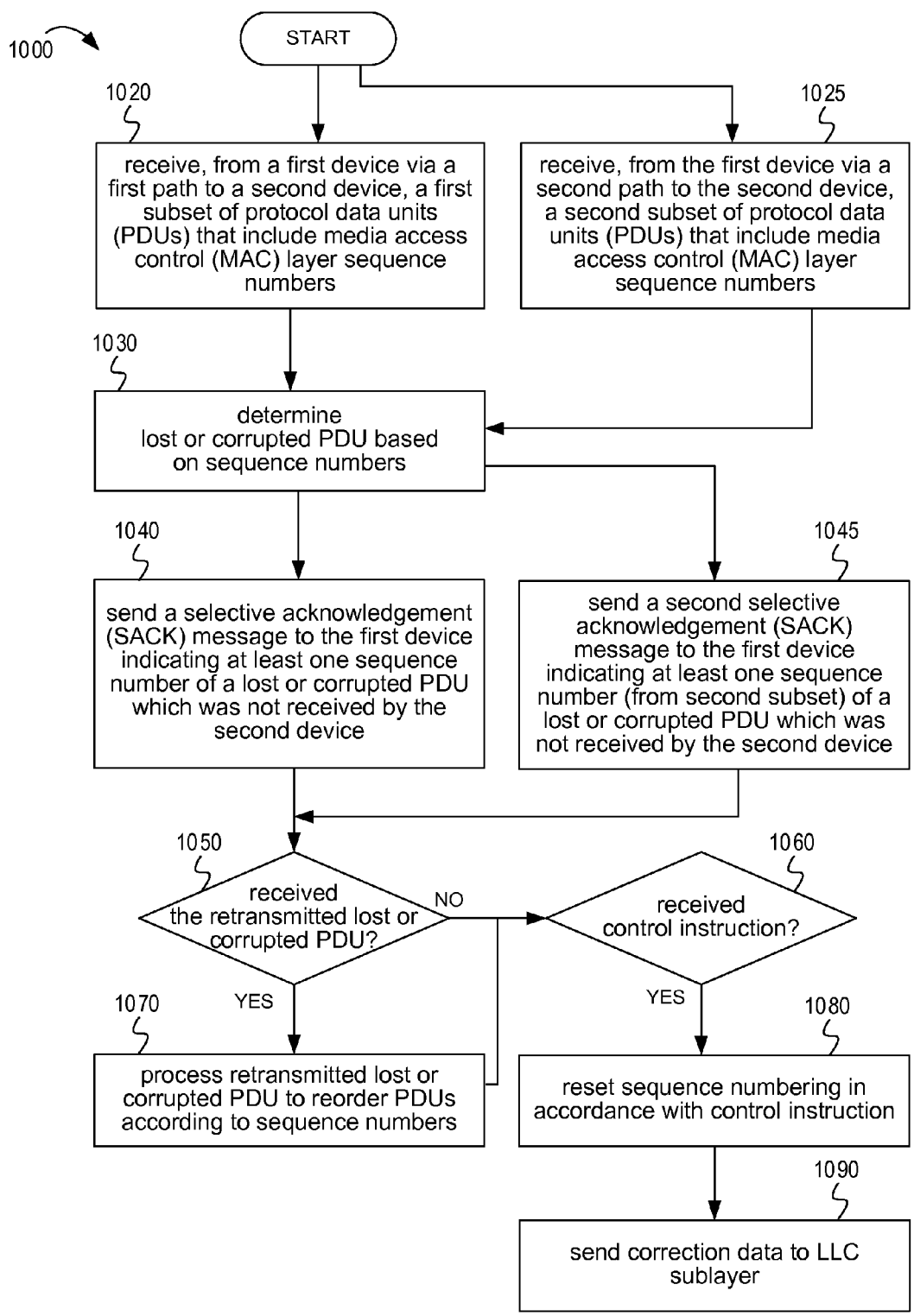
FIG. 10 is another flow diagram illustrating example operations for a destination device implementing enhanced acknowledgement and retransmission in accordance with an embodiment of the present disclosure.

FIG. 10 is another flow diagram 1000 illustrating example operations for a second device (such as second device 120, 320, 520, 620) implementing enhanced acknowledgement and retransmission in accordance with an embodiment of the present disclosure. At 1020, the second device may receive, from a first device via a first path to the second device, a first subset of protocol data units (PDUs) that include media access control (MAC) layer sequence numbers. At optional block 1025 the second device may also receive, from the first device via a second path to the second device, a second subset of protocol data units (PDUs) that include media access control (MAC) layer sequence numbers.

At 1030, the second device may determine whether there are any lost or corrupted PDU based on sequence numbers for any PDUs received via operations 1020, 1025. For example, the second device may maintain a register, circular buffer, or other memory storage for maintaining a listing of received sequence numbers.

At 1040, the second device may send a selective acknowledgement (SACK) message to the first device indicating at least one sequence number of a lost or corrupted PDU which was not received by the second device. In one embodiment, the SACK message may include missing sequence numbers for PDUs missing from either operations 1020 or 1025. Alternatively, at optional block 1045, the second device may send a second selective acknowledgement (SACK) message to the first device indicating at least one sequence number (from second subset) of a lost or corrupted PDU which was not received by the second device during operation 1025.

At decision block 1050, the second device determines whether it has received the retransmitted lost or corrupted PDU. If the second device determines that it has received a retransmitted PDU, then at 1070, the second device may process the retransmitted lost or corrupted PDU to reorder PDUs according to sequence numbers. If at decision block 1050, the second device has not received the retransmitted PDU, the operation at 1060 may be performed. Additionally, after processing a received retransmitted PDU, the operation at 1060 may also still be performed.

At 1060 the second device determines whether it has received a control instruction from the first device regarding the sequence numbers. For example, the control instruction may be in the form of a separate control message (such as a P1905.1 control message) or may be included as a portion of a retransmitted PDU.

If at 1060, the second device determines that it has received a control instruction, then at 1080, the second device may reset sequence numbering in accordance with control instruction. For example, the control instruction may indicate that sequence numbers earlier than a particular sequence number will no longer be retransmitted. The second device may then modify the register, circular buffer, or other memory storage as necessary to avoid duplicate processing or selective acknowledgement of sequence numbers earlier than the particular sequence number.

At 1090, the second device may send correction data to LLC sublayer. For example, the second device may abridge the LLC protocol to trick LLC into acting as if a PDU has been delivered that is just too old to process. This may be desirable, as a non-limiting example, with regard to loss tolerant applications.

It should be understood that FIGS. 1-10 and the operations described herein are examples meant to aid in understanding embodiments and should not be used to limit embodiments or limit scope of the claims. Embodiments may perform additional operations, fewer operations, operations in a different order, operations in parallel, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
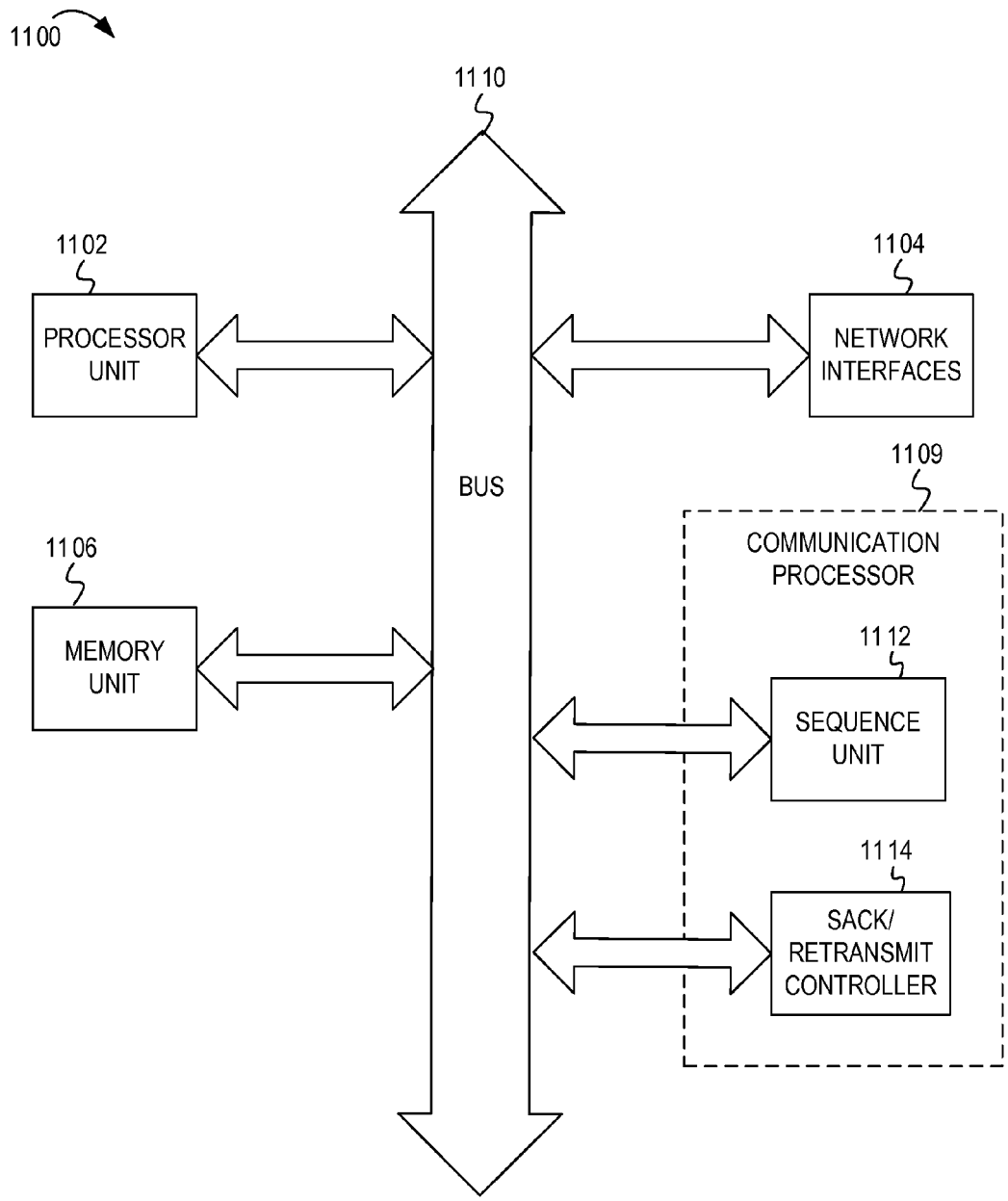
FIG. 11 is an example block diagram of one embodiment of an electronic device including a communication unit for an enhanced acknowledgement and retransmission mechanism.

FIG. 11 is an example block diagram of one embodiment of an electronic device 1100 including a communication unit for implementing enhanced acknowledgement and retransmission mechanism(s) in accordance with this disclosure. In some implementations, the electronic device 1100 may be one of a laptop computer, a netbook, a mobile phone, a powerline communication device, a personal digital assistant (PDA), or other electronic systems comprising a hybrid communication unit configured to exchange communications across multiple communication networks (which form the hybrid communication network). The electronic device 1100 may include a processor unit 1102 (possibly including multiple processors, multiple cores, multiple nodes, and/or implementing multi-threading, etc.). The electronic device 1100 may include a memory unit 1106. The memory unit 1106 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1100 may also include a bus 1110 (e.g., PCI, ISA, PCI-Express, HyperTransport®, InfiniBand®, NuBus, AHB, AXI, etc.), and network interfaces 1104 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, a powerline communication interface, etc.). In some implementations, the electronic device 1100 may support multiple network interfaces—each of which is configured to couple the electronic device 1100 to a different communication network.

The electronic device 1100 also a sequence unit 1112 and a selective acknowledgment/retransmit controller 1114. As described above in FIGS. 1-10, the sequence unit 1112 and SACK/retransmit controller 1114 may implement functionality to send a selective acknowledgment when the electronic device 1100 is a recipient of PDUs associated with a packet stream. Alternatively, as described above in FIGS. 1-10, the sequence unit 1112 and SACK/retransmit controller 1114 may implement functionality to selectively retransmit PDUs associated with unacknowledged PDUs.

In some embodiments, the sequence unit 1112 and SACK/retransmit controller 1114 may be included as part of a communication unit 1109. It should be understood, that in some embodiments, the communication unit 1109 may also have a dedicated processor (e.g., such as a communication unit comprising a system on a chip, or board with multiple chips, or multiple boards, in which the communication may have one or more dedicated processor or processing unit(s), in addition to the main processor 1102). Any one of these functionalities may be partially (or entirely) implemented in hardware and/or on the processor unit 1102. For example, the functionality may be implemented with an application specific integrated circuit, in logic implemented in the processor unit 1102, in a co-processor on a peripheral device or card, etc. Further, realizations may include fewer or additional components not illustrated in FIG. 11 (e.g., video cards, audio cards, additional network interfaces, peripheral devices, etc.). The processor unit 1102, the memory unit 1106, and the network interfaces 1104 are coupled to the bus 1110. Although illustrated as being coupled to the bus 1110, the memory unit 1106 may be coupled to the processor unit 1102.

While the embodiments are described with reference to various implementations and exploitations, it will be understood that these embodiments are illustrative and that the scope of the inventive subject matter is not limited to them. In general, enhanced tone maps as described herein may be implemented with facilities consistent with any hardware system or hardware systems. Many variations, modifications, additions, and improvements are possible.

What is claimed is:

1. A method for communicating via a network, the method comprising:
   transmitting, from a first device via at least a first path of the network to a second device, a series of protocol data units (PDUs), wherein each PDU of the series of PDUs includes an associated sequence number;
   receiving a first selective acknowledgement (SACK) message from the second device indicating that at least one unacknowledged PDU of the series of PDUs was not properly received by the second device; and
   transmitting a control indicator responsive to receiving the first SACK message, the control indicator including a first sequence number to indicate that the first device will not retransmit an unacknowledged PDU associated with a prior sequence number earlier than the first sequence number.

2. The method of claim 1, retransmitting, via a second path of the network, a first PDU indicated by the first SACK message responsive to receiving the first SACK message, wherein the second path has a lower latency relative to the first path.

3. The method of claim 1, further comprising:
   determining whether to retransmit a first unacknowledged PDU indicated by the first SACK message based, at least in part, on an estimated retransmission delay for the first unacknowledged PDU and at least one quality of service requirement associated with the series of PDUs.

4. The method of claim 3, further comprising:
   refraining from retransmitting the first unacknowledged PDU based, at least in part, on the estimated retransmission delay being greater than a delay tolerance threshold associated with the at least one quality of service requirement.

5. The method of claim 1,
   wherein the control indicator comprises a control message.

6. The method of claim 1, wherein transmitting the control indicator comprises retransmitting a first unacknowledged PDU indicated by the first SACK message, and wherein the control indicator is included with the first unacknowledged PDU.

7. The method of claim 1, wherein the sequence numbers are useable by the second device to deliver data from the series of PDUs to upper layers in an order that the series of PDUs were transmitted.

8. The method of claim 1, wherein the series of PDUs transmitted via the first path comprise a first subset of PDUs associated with a packet stream, the method further comprising:
   transmitting, from the first device via a second path to the second device, a second subset of PDUs associated with the packet stream, wherein each PDU of the second subset of PDUs includes an associated sequence number.

9. The method of claim 8, wherein sequence numbers associated with PDUs from the first subset of PDUs and the second subset of PDUs are unique among the PDUs for the packet stream.

10. The method of claim 8, wherein the first SACK message indicates sequence numbers of unacknowledged PDUs from both of the first subset of PDUs and the second subset of PDUs.

11. The method of claim 8, wherein the first SACK message is associated with acknowledgement feedback regarding the first subset of PDUs, the method further comprising:
    receiving a second SACK message associated with other acknowledgement feedback regarding the second subset of PDUs.

12. The method of claim 11, wherein the first SACK message and the second SACK message are received at the first device via a same feedback path from the second device to the first device.

13. The method of claim 1, wherein the associated sequence number included in each PDU of the series of PDUs are included in a virtual local area network (VLAN) header that has been repurposed to include the associated sequence number.

14. A first device comprising:
    a network interface configured to transmit, from the first device via at least a first path of a network to a second device, a series of protocol data units (PDUs), wherein each PDU of the series of PDUs includes an associated sequence number; and
    a selective acknowledgement (SACK) and retransmit (SACK/Retransmit) controller configured to receive a first SACK message from a second device indicating that at least one unacknowledged PDU of a series of protocol data units (PDUs) was not properly received by the second device and to transmit a control indicator responsive to receipt of the first SACK message, the control indicator including a first sequence number to indicate that the first device will not retransmit an unacknowledged PDU associated with a prior sequence number earlier than the first sequence number.

15. The first device of claim 14, wherein the SACK/Retransmit controller is further configured to:
    retransmit, via a second path of the network, a first PDU indicated by the first SACK message responsive to the receipt of the first SACK message, wherein the second path has a lower latency relative to the first path.

16. The first device of claim 14, wherein the SACK/Retransmit controller is further configured to:
    determine whether to retransmit a first unacknowledged PDU indicated by the first SACK message based, at least in part, on an estimated retransmission delay of the first unacknowledged PDU and at least one quality of service requirement associated with the series of PDUs.

17. The first device of claim 16, wherein the SACK/Retransmit controller is further configured to:
    refrain from retransmission of the first unacknowledged PDU based, at least in part, on the estimated retransmission delay being greater than a delay tolerance threshold associated with the at least one quality of service requirement.

18. The first device of claim 16,
    wherein the control indicator comprises a control message.

19. The first device of claim 14, wherein the SACK/Retransmit controller configured to transmit the control indicator comprises the SACK/Retransmit controller being further configured to retransmit a first unacknowledged PDU indicated by the first SACK message, and wherein the control indicator is included with the first unacknowledged PDU.

20. The first device of claim 14, wherein the sequence numbers are useable by the second device to deliver data from the series of PDUs to upper layers in an order that the series of PDUs were transmitted.

21. The first device of claim 14, wherein the series of PDUs transmitted via the first path comprise a first subset of PDUs associated with a packet stream, and wherein the SACK/Retransmit controller is further configured to:
   transmit, from the first device via a second path to the second device, a second subset of PDUs associated with the packet stream, wherein each PDU of the second subset of PDUs includes an associated sequence number.

22. The first device of claim 21, wherein sequence numbers associated with PDUs from the first subset of PDUs and from the second subset of PDUs are unique among the PDUs for the packet stream.

23. The first device of claim 21, wherein the first SACK message indicates sequence numbers of unacknowledged PDUs from both of the first subset of PDUs and the second subset of PDUs.

24. The first device of claim 21, wherein the first SACK message is associated with acknowledgement feedback regarding the first subset of PDUs, and wherein the SACK/Retransmit controller is further configured to:
   receive a second SACK message associated with other acknowledgement feedback regarding the second subset of PDUs.

25. The first device of claim 24, wherein the first SACK message and the second SACK message are received at the first device via a same feedback path from the second device to the first device.

26. A non-transitory computer readable medium having instructions stored therein which, when executed by a processor of a first device, cause the first device to:
   transmit, from the first device via at least a first path of a network to a second device, a series of protocol data units (PDUs), wherein each PDU of the series of PDUs includes an associated sequence number;
   receive a selective acknowledgement (SACK) message from the second device indicating that at least one unacknowledged PDU of the series of PDUs was not properly received by the second device; and
   transmit a control indicator responsive to receipt of the SACK message, the control indicator including a first sequence number to indicate that the first device will not retransmit an unacknowledged PDU associated with a prior sequence number earlier than the first sequence number.

27. The non-transitory computer readable medium of claim 26, wherein the instructions, when executed by the processor of the first device, cause the first device to:
   determine whether to retransmit a first unacknowledged PDU indicated by the SACK message based, at least in part, on an estimated retransmission delay of the first unacknowledged PDU and at least one quality of service requirement associated with the series of PDUs.

28. The non-transitory computer readable medium of claim 27, wherein the instructions, when executed by the processor of the first device, cause the first device to:
   refrain from retransmitting the first unacknowledged PDU based, at least in part, on the estimated retransmission delay being greater than a delay tolerance threshold associated with the at least one quality of service requirement.

29. The non-transitory computer readable medium of claim 26, wherein the control indicator comprises a control message.

30. The non-transitory computer readable medium of claim 26, wherein the instructions, when executed by the processor of the first device, cause the first device to:
   retransmit a first unacknowledged PDU indicated by the SACK message,
   wherein the control indicator is included with the first unacknowledged PDU.

31. An apparatus for communicating via a network, the apparatus comprising:
   means for transmitting, from a first device via at least a first path of the network to a second device, a series of protocol data units (PDUs), wherein each PDU of the series of PDUs includes an associated sequence number;
   means for receiving a selective acknowledgement (SACK) message from the second device indicating that at least one unacknowledged PDU of the series of PDUs was not properly received by the second device; and
   means for transmitting a control indicator responsive to receiving the SACK message, the control indicator including a first sequence number to indicate that the first device will not retransmit an unacknowledged PDU associated with a prior sequence number earlier than the first sequence number.

32. The apparatus of claim 31, further comprising:
   means for determining whether to retransmit a first unacknowledged PDU indicated in the SACK message based, at least in part, on an estimated retransmission delay of the first unacknowledged PDU and at least one quality of service requirement of the series of PDUs.

33. The apparatus of claim 32 further comprising:
   means for refraining from retransmitting the first unacknowledged PDU based, at least in part, on the estimated retransmission delay being greater than a delay threshold associated with the at least one quality of service requirement.

34. The apparatus of claim 32, wherein the control indicator is included in a control message or in a header of a retransmitted PDU.

35. The method of claim 1,
   wherein transmitting the series of PDUs comprises transmitting a first subset of the series of PDUs via the first path of the network and transmitting a second subset of the series of PDUs via a second path of the network,
   wherein the series of PDUs is associated with a packet stream, and
   wherein the sequence numbers are unique among the series of PDUs associated with the packet stream regardless of which path a PDU of the series of PDUs traverses through the network.

36. The method of claim 35, wherein the sequence numbers included in the series of PDUs are assigned at a media access control (MAC) layer, and wherein the packet stream is associated with a higher layer than the MAC layer.

37. The method of claim 35, wherein transmitting the first subset and transmitting the second subset comprises:
   determining latencies of the first path and the second path; and
   scheduling transmission of the first subset and the second subset via the first path and the second path, respectively, based, at least in part, on the latencies of the first path and the second path such that the series of PDUs arrive in approximate order.

* * * * *